(12) United States Patent
Mandry et al.

(10) Patent No.: US 7,676,132 B1
(45) Date of Patent: Mar. 9, 2010

(54) BEND RADIUS CONTROL

(75) Inventors: Michael A. Mandry, Frisco, TX (US);
Maurice M. Guy, Garland, TX (US)

(73) Assignee: Cisco Technology, Inc., San Jose, CA (US)

( * ) Notice: Subject to any disclaimer, the term of this patent is extended or adjusted under 35 U.S.C. 154(b) by 813 days.

(21) Appl. No.: 10/212,820

(22) Filed: Aug. 6, 2002

(51) Int. Cl.
*G02B 6/001* (2006.01)
(52) U.S. Cl. ..................................... 385/134
(58) Field of Classification Search .......... 385/134–137
See application file for complete search history.

(56) References Cited

U.S. PATENT DOCUMENTS

| | | | | |
|---|---|---|---|---|
| 3,796,823 A | * | 3/1974 | Wright et al. ................. | 174/92 |
| 3,827,704 A | * | 8/1974 | Gillemot et al. ............. | 277/606 |
| 4,787,704 A | * | 11/1988 | Knecht et al. ................. | 385/64 |
| 5,185,844 A | * | 2/1993 | Bensel et al. ................ | 385/135 |
| 5,452,393 A | * | 9/1995 | Stowe et al. ................ | 385/123 |
| 5,640,476 A | * | 6/1997 | Womack et al. ................ | 385/86 |
| 5,661,841 A | * | 8/1997 | Van Noten ................... | 385/135 |
| 5,710,851 A | * | 1/1998 | Walter et al. .................. | 385/86 |
| 5,781,681 A | * | 7/1998 | Manning ..................... | 385/86 |
| 6,672,774 B2 | * | 1/2004 | Theuerkorn et al. ........... | 385/86 |
| 6,674,951 B1 | * | 1/2004 | Erwin et al. ................. | 385/134 |
| 6,695,490 B2 | * | 2/2004 | Shirakawa et al. ............ | 385/86 |

* cited by examiner

*Primary Examiner*—P Macchiarolo
(74) *Attorney, Agent, or Firm*—Campbell Stephenson LLP

(57) ABSTRACT

A bend radius control device for routing and maintaining at least a minimum bend radius of a cable. The bend radius control device includes an arcuate member having a channel and at least one holding portion. The holding portion is configured to hold the bend radius device to one or more cables inserted therein, while the channel is configured to support the one or more cables. A grommet may be used to with the holding portions to aid the holding portion in holding one or more cables inserted in the bend radius control device. The arcuate member has a bend radius that is greater than or equal to the minimum bend radius of one or more cables inserted therein. The bend radius control device is similar in size to a number of cables inserted therein and may be used in a space saving environment.

41 Claims, 7 Drawing Sheets

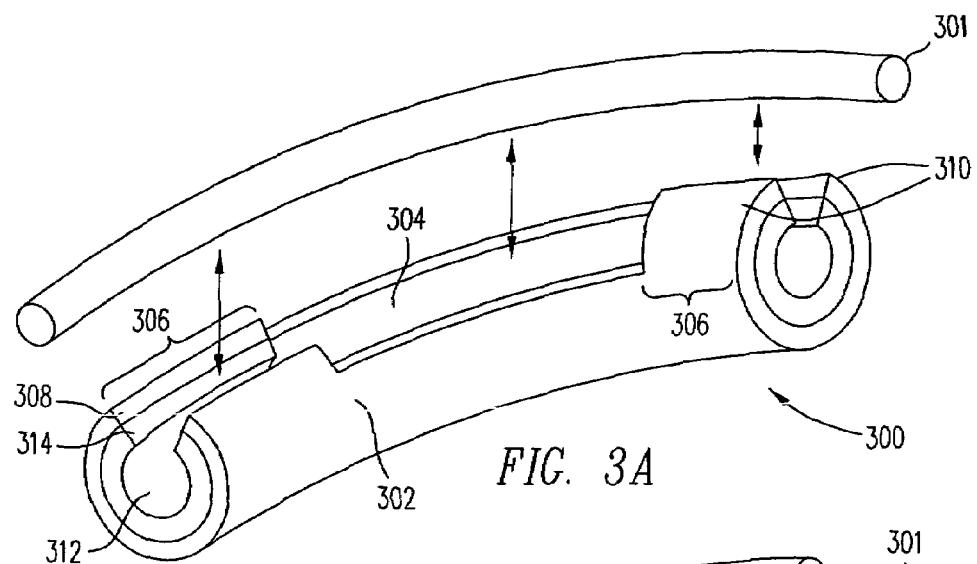
FIG. 3A
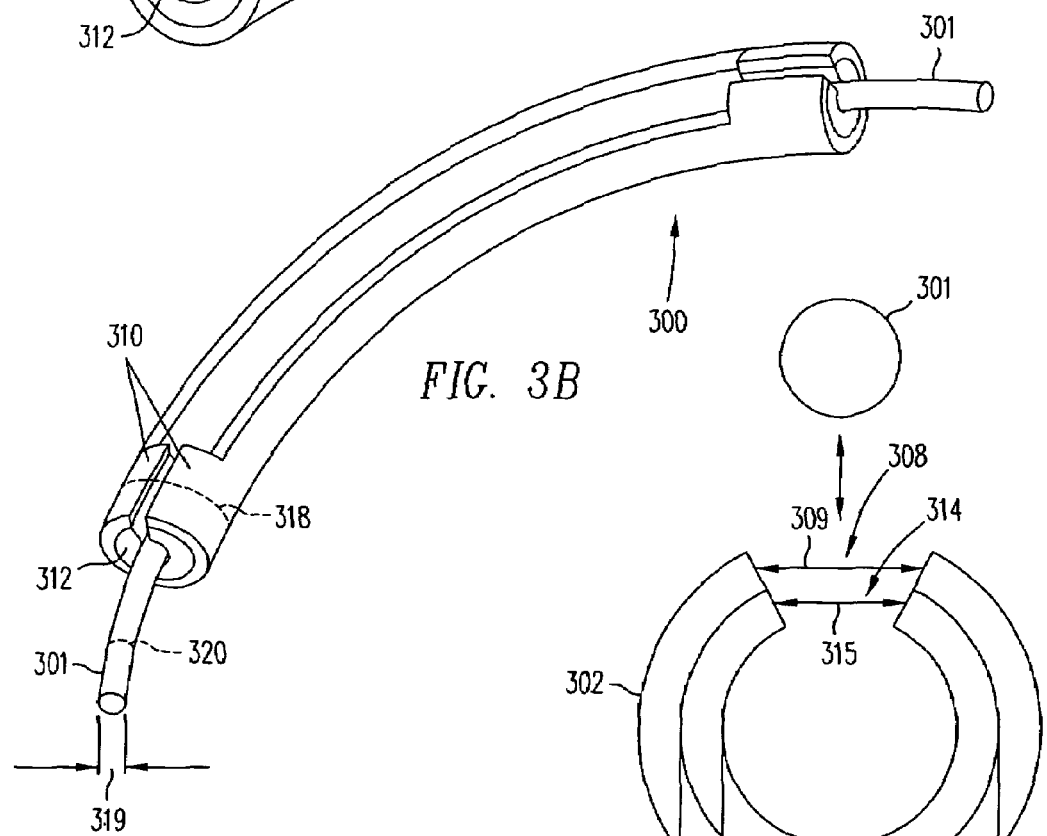
FIG. 3B
FIG. 3C

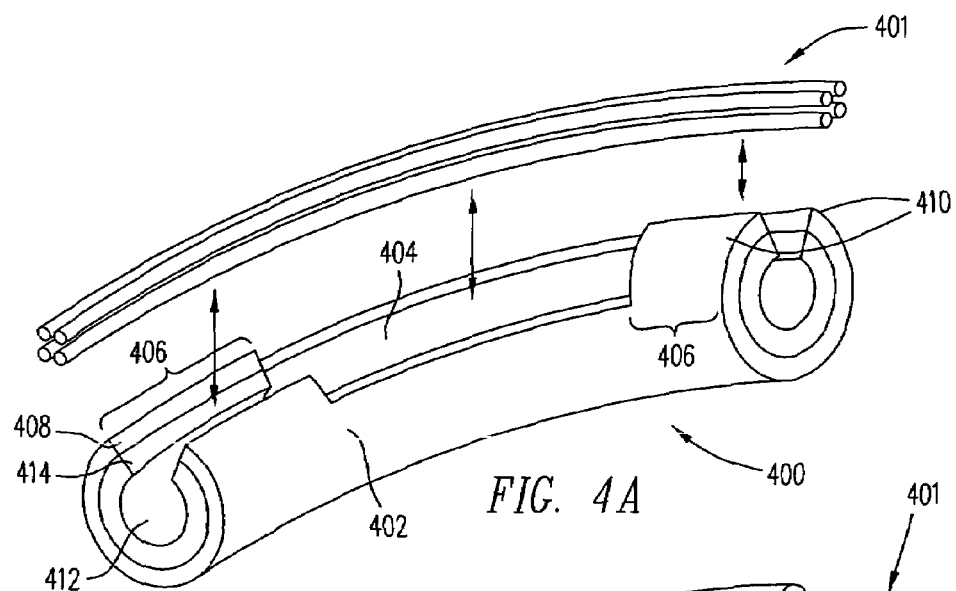
FIG. 4A
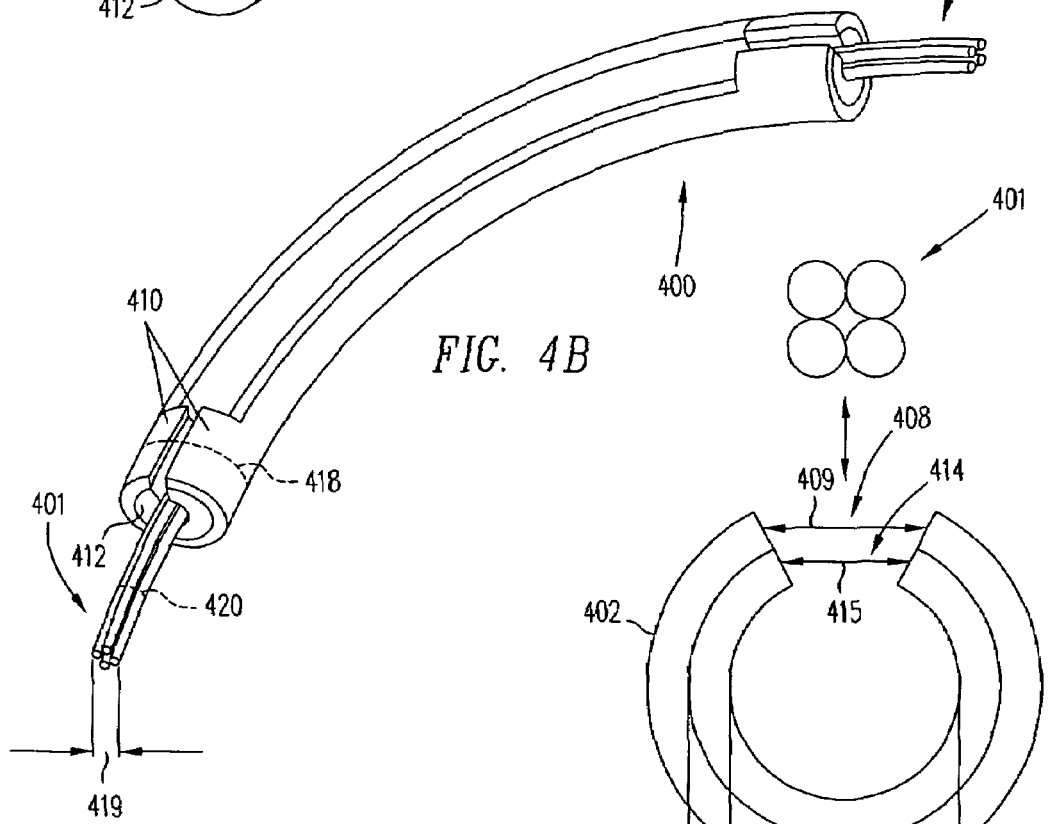
FIG. 4B
FIG. 4C

BEND RADIUS CONTROL

BACKGROUND OF THE INVENTION

1. Field of the Invention

The present invention relates generally to communication systems, and more particularly, to a device for routing one or more communication cables.

2. Description of the Related Art

The use of fiber optics in high-speed bandwidth transmission networks has grown rapidly. With the increasing bandwidth demands on these networks, density has become a critical factor in determining market share. However, the physical footprint available to network equipment has not grown. In fact, the amount of physical space available to network equipment has become smaller. Thus, the increasing density poses the challenge of fitting substantial amount of fiber and electronic hardware into a small space. The space saving challenge becomes even more difficult when, for example, additional hardware must be used to route and protect the fiber cable from breakage.

Fiber optic cables are extremely fragile and require a minimum bend radius to avoid damage to the glass core, which can result in a large dB loss throughout the system, and/or loss of the cable. The bend radius of a cable is defined as the smallest radius the cable can bend before degradation occurs in the cable and/or the cable signal. With respect to fiber optics, for example, the bend radius is the smallest radius a fiber cable can bend before increased attenuation or breakage of the cable occurs. With a large number of fiber cables on a printed circuit board (PCB), having a minimum bend radius for every fiber at every bend is difficult to achieve. Existing designs utilize fiber clips or fiber spools that mount into the PCB. However, these introduce holes into the PCB which may obstruct routing paths for signals within the many layers of the PCB, for example.

Accordingly, there exists the need for a system and method for controlling the bend radius of one or more cables without consuming already limited space.

SUMMARY OF THE INVENTION

A bend radius control device for maintaining at least a minimum bend radius of a cable is disclosed. The bend radius control device includes an arcuate member configured to define a cable pathway having a bend radius equal to or greater than a minimum bend radius of the cable. The arcuate member defines a channel and includes at least one holding portion configured to hold the bend radius control apparatus to the cable The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIGS. 1A, 1B, and 1C illustrate a perspective view, an end view, and a cross-sectional view taken through line A-A, respectively, of an exemplary structure for controlling the bend radius of one or more cables according to the present invention.

FIGS. 3(A-C) illustrate a method for controlling the bend radius of a cable according to the present invention.

FIGS. 4(A-C) illustrate a method for controlling the bend radius of a number of cables according to the present invention.

DETAILED DESCRIPTION

Generally, the bend radius of a cable is defined as the smallest radius the cable can bend before degradation occurs in the cable and/or the cable signal. Embodiments of the present invention provide the ability to control the minimum bend radius of a cable, resulting in an increase in signal quality and the integrity of the cable. The following sets forth a detailed description of a mode for carrying out the present invention. The description is intended to be illustrative of the invention and should not be taken as limiting.

Figure 1C:
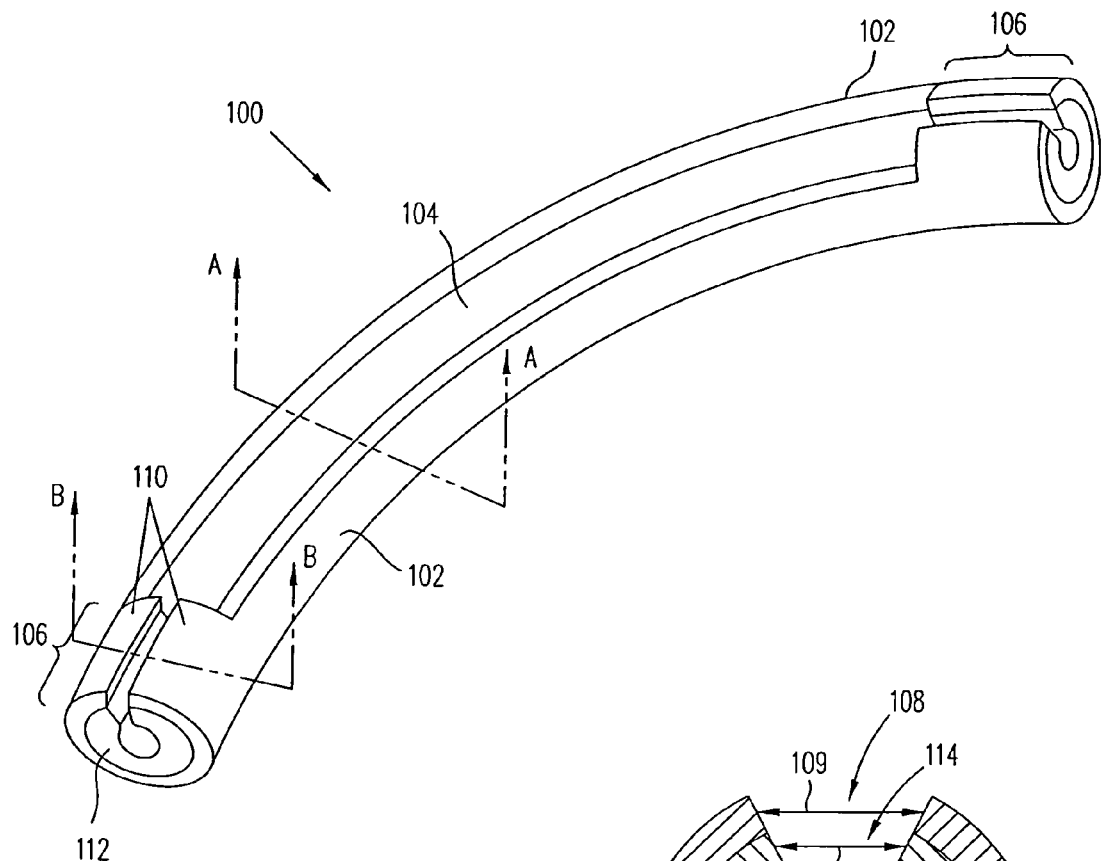
Figure 1C:
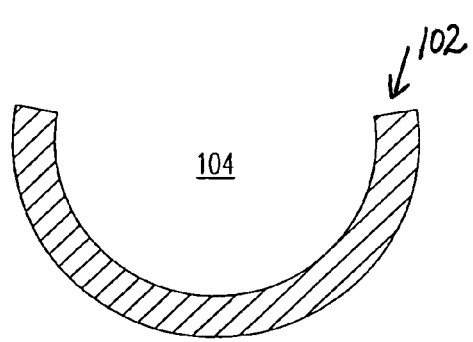
Figure 1B:
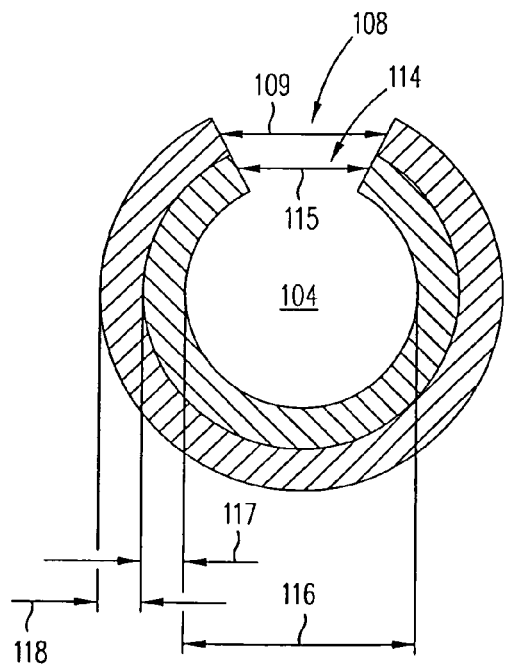

FIG. 1A illustrates a perspective view of a bend radius control device 100 used for controlling the bend radius of one or more cables (e.g., cables 401 of FIG. 4) in accordance with the present invention. FIG. 1B is an end view of bend radius control device 100. FIG. 1C illustrates a cross-sectional view taken through line A-A of bend radius control device 100.

Bend radius control device 100 includes an arcuate member 102. Arcuate member 102 has a bend radius equal to or greater than a minimum bend radius of one or more cables inserted in bend radius control device 100. Although in the described embodiment arcuate member 102 is cylindrical, arcuate member 102 may be an elliptical cylinder, or a multi-sided cylinder, for example a hexagonal cylinder.

Arcuate member 102 includes a channel 104 and holding portions 106. Channel 104 is formed from arcuate member 102 and provides support for one or more cables inserted in bend radius control device 100. Holding portion 106 is made from a wall of said arcuate member 102 and holds bend radius control device 100 to one or more cables inserted in bend radius control device 100. As shown in FIG. 1, each holding portion 106 is located at or near opposite ends of arcuate member 102 with channel 104 located in between each holding portion 106. Alternatively, other embodiments of bend radius control device 100 may include one or more differently positioned holding portions 106. For example, one embodiment may include one holding portion 106 that is of the same length or shorter than arcuate member 102; Another embodiment includes a number of holding portions spaced along channel 104.

Holding portion 106 includes a slot 108 and wings 110. Slot 108 defines an opening along a longitudinal side of arcuate member 102 to receive one or more cables. A width 109 of the opening defined by slot 108 is smaller than the diameter of one or more cables to be inserted through the opening defined by slot 108. Wings 110 are formed from a wall of arcuate member 102. Wings 110 are flexible enough to allow a cable to pass through the opening defined by slot 108, yet firm enough to keep the cable retained in bend radius control device 100 during operation.

Holding portion 106 also includes a grommet 112 which further includes slot 114. Grommet 112 is preferably made of a compressible material (e.g., rubber, foam, or equivalent material) and so is preferably flexible enough to allow one or more cables to be received through the opening defied by a slot 114, yet firm enough to retain the cable under temperature changes and vibrations experienced during operation of a system in which bend radius control device 100 is installed. A width 115 of the opening defined by a slot 114 is smaller than the diameter of one or more cables to be inserted through the opening.

Grommet 112 can be attached to an inner wall of channel 104 and wings 110 with, for example, an adhesive (not shown). Such adhesive preferably meets the Underwriters Laboratories, Inc. (UL) requirements for flammability as well as outgassing (e.g., does not give off any toxic fumes or smoke when burned). Alternatively, grommet 112 may be an integral part of arcuate member 102. A diameter 116 of the opening of grommet 112 is slightly smaller than the diameter of one or more cables inserted therein. Grommet 112 and wings 110 firmly hold bend radius control device 100 to one or more cables without pinching or kinking the one or more cables.

Grommet 112 has a thickness 117 and arcuate member 102 has a thickness 118. Together, the sum of thickness 118, thickness 117, and diameter 116 is slightly larger than the diameter of one or more cables inserted in bend radius control device 100. Thus, bend radius control device 100 has a slightly larger circumference than the one or more cables to which bend radius control device 100 is attached. This similarity in size allows bend radius control device to be used in space-constrained areas to control the bend radius of one or more cables without consuming appreciably more space than that consumed by the one or more cables originally.

Arcuate member 102 is preferably made of a polycarbonate such as GE Cycoloy C2800 or GE Cycoloy C6200. Such polycarbonates are able to hold the arcuate cylindrical form of arcuate member 102 and do not break down under high temperatures and/or temperature variations. Additionally, the polycarbonates have fire safety rating of UL94V-0 (UL 94 is the Underwriters Laboratories, Inc. Test for Flammability of Plastic Materials for Parts in Devices and Appliances). It is preferable that arcuate member 102 be designed with a radius on all edges to eliminate the risk of damage to one or more cables which may occur, for example, during installation or extraction of one or more cables, or during low-level vibrations while in use. Although in the described embodiment, arcuate member 102 may be made from the aforementioned polycarbonates, arcuate member 102 may be made from any plastic or other material which generally provides the characteristics described above.

Figure 2:
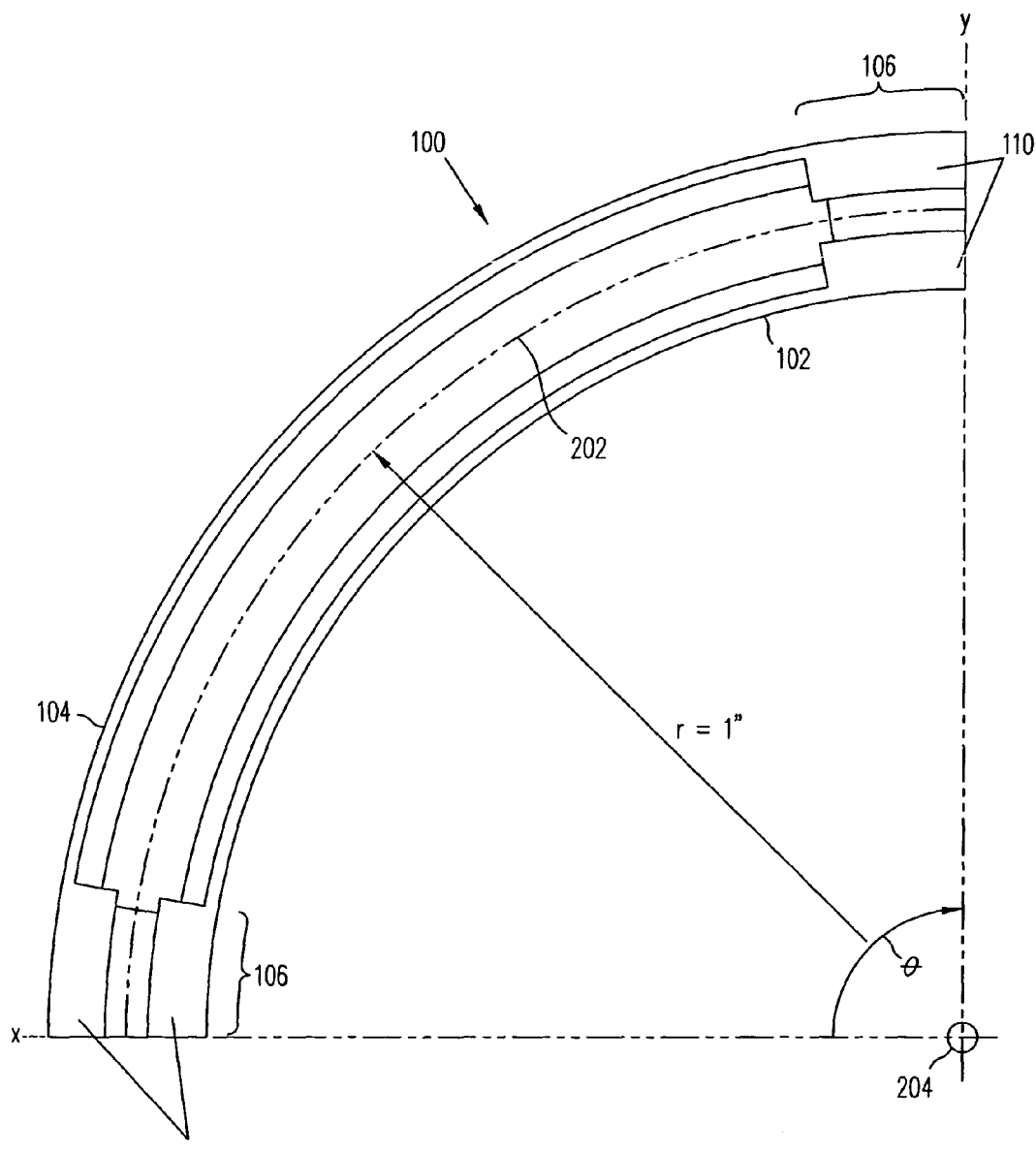
FIG. 2 illustrates a top view of an exemplary structure for controlling the bend radius of one or more cables according to the present invention.

FIG. 2 illustrates a top view of bend radius device 100 used for controlling the bend radius of one or more cables according to the present invention. As shown in FIG. 2, arcuate member 102 defines a cable pathway 202 through channel 104 and holding portions 106. The arc length, represented by (s), of cable pathway 202 is the product of the radian angle (θ) through which cable pathway 202 spans and the radius (r) of a circle defined by cable pathway 202. Expressed mathematically by Formula 1, this can be written as $$s = r\theta \qquad \text{Formula 1.}$$

In the described embodiment, r is 1 inch, and θ is π/2 radians. Plugging these values into Formula 1, the described embodiment has an arc length of approximately 1.57 inches. Although the described embodiment is shown and described has having a one inch bend radius, embodiments of the present invention are not limited to a one inch bend radius. Other embodiments of the present invention can have a bend radius either smaller or larger than one inch.

The bend radius of cable pathway 202 defined by arcuate member 102 is now described. Generally, the bend radius of a cable is defined as the smallest radius the cable can bend before degradation occurs in the cable and/or the cable signal. With respect to fiber optics for example, the bend radius is the smallest radius a fiber cable can bend before increased attenuation or breakage of the cable occurs. Thus, a fiber cable which is bent too much (e.g., beyond the minimum bend radius), may be damaged.

The bend radius of a cable is measured from a radial center point to a cable center line. As shown in FIG. 2, the bend radius of bend radius control device 100 is measured from a radial center point 204 on the X-Y plane to a center line of a cable pathway 202 (FIG. 2 is not drawn to scale). It is preferable that the bend radius of bend radius control device 100 be greater than or equal to a minimum bend radius of one or more cables held therein.

FIGS. 3(A-C) illustrate a method for controlling the bend radius of a cable (e.g., a fiber cable) according to the present invention. Initially, bend radius control device 300 (similar to bend radius control device 100 of FIG. 1) is aligned with cable 301 so that cable 301 is proximate to each holding portion 306. In the described embodiment, cable 301 is a fiber optic cable. Next, cable 301 is inserted through the openings defined by slots 308 and slots 314 of each holding portion 306. Widths 309 and 315 of the openings defined by slots 308 and slots 314, respectively, are preferably smaller than a diameter 319 of cable 301. However, wings 310 and grommet 312 are flexible enough to allow cable 301 to pass through the openings defined by slots 308 and slots 314, respectively, unharmed, yet firm enough to hold cable 301 in bend radius control device 300. Following insertion in holding members 306, cable 301 is inserted in channel 304. Alternatively, cable 301 can be inserted in channel 304, then inserted in holding portions 306.

As shown in FIG. 3C, cable 301 is partially enclosed by grommet 312 and wings 310. A diameter 316 of an opening in grommet 312 is slightly smaller than a diameter 319 of cable 301, allowing grommet 312 to grip cable 301 without kinking or pinching cable 301. Grommet 312 may be located in holding portion 306, or alternatively, grommet 312 may be located on cable 301 and then inserted into holding portion 306 along with cable 301. Although the described embodiment includes grommet 312, other embodiments of the present invention do not include a grommet. In embodiments where a grommet is not present, arcuate member 302 has a diameter 318 more closely matched to diameter 319 of cable 301. Alternatively, grommet 312 may be an integral part of arcuate member 302.

As seen in FIG. 3C, a circumference 318 of bend radius control device 300 is slightly larger than a circumference 320 of cable 301. This greatly reduces the amount of space bend radius control device 300 occupies, which allows bend radius control device 300 to be used in space-constrained areas.

FIGS. 4(A-C) illustrate a method similar to the method of FIG. 3, but with respect to controlling the bend radius of a number of cables (e.g., fiber cables) according to the present invention. Initially, bend radius control device 400 (similar to bend radius control device 100 of FIG. 1) is aligned with cables 401 so that cables 401 are proximate to the opening defined by slot 408 in holding portion 406. Next, cables 401 are inserted through the openings defined by slots 408 and slots 414. Widths 409 and 413 of the openings defined by slots 408 and slots 414, respectively, are preferably smaller than a diameter of cables 401, taken together. However, the materials of wings 410 and grommet 412 should be flexible enough to allow cables 401 to pass through the openings defined by slots 408 and slots 414 unharmed, yet firm enough to hold cables 401 in bend radius control device 400. Following insertion in holding members 406, cables 401 are inserted in channel 404. Alternatively, cables 401 can be inserted in channel 404, then inserted in holding portions 406.

As shown in FIG. 4C, cables 401 are partially enclosed by grommet 412 and wings 410. A diameter 416 of the opening in grommet 412 is slightly smaller than a diameter 419 of cables 401, allowing grommet 412 to grip cables 401 without kinking or pinching cables 401. Holding portion 406 firmly holds bend radius control device 400 to cable 401. A diameter 416 an opening in grommet 412 is slightly smaller than a diameter 419 of cables 401, allowing grommet 412 to grip cables 401 without kinking or pinching cables 401. Grommet 412 can be located in holding portion 406, or alternatively, grommet 412 may be located on cables 401 of and then inserted into holding portion 406 along with cables 401. Although the described embodiment includes grommet 412, other embodiments of the present invention do not include a grommet. In embodiments which do not include a grommet, arcuate member 402 has a diameter 418 more closely matched to diameter 419 of cables 401. Alternatively, grommet 412 may be an integral part of arcuate member 402.

As seen in FIG. 4C, a circumference 418 of bend radius control device 400 is slightly larger than a circumference 420 of cable 401. This greatly reduces the amount of space bend radius control device 400 consumes, which allows bend radius control device 400 to be used in most any area, including space constrained areas.

Figure 5:
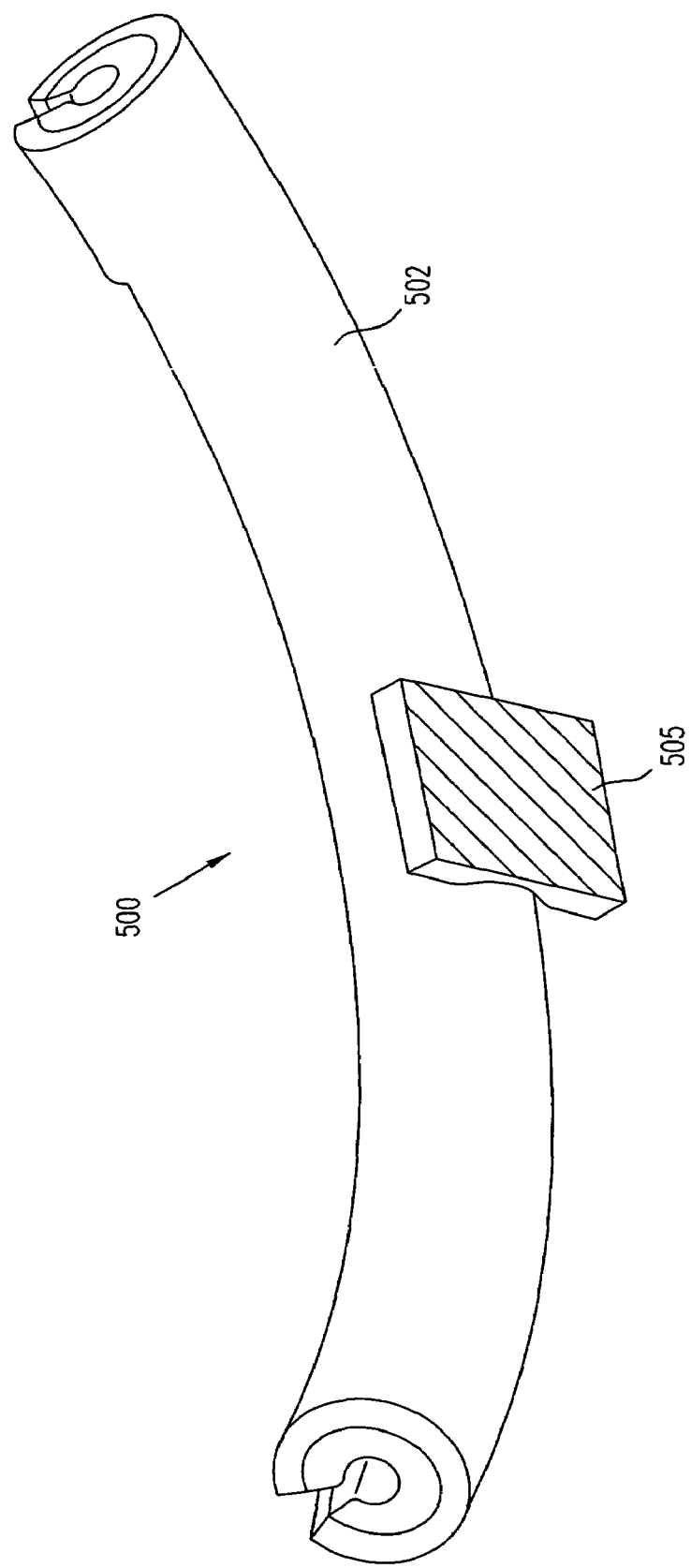
FIG. 5 illustrates a perspective view of an exemplary structure including a rear fastener for controlling the bend radius of one or more cables according to the present invention.

FIG. 5 illustrates a perspective view of another embodiment of an exemplary bend radius control device according to the present invention. Bend radius control device 500 is similar to bend radius control device 100 of FIG. 1. However, bend radius control device 500 includes fastener 505 to fasten bend radius control device 500 and one or more cables inserted therein (not shown) to a surface (not shown). In the described embodiment, fastener 505 is preferably an adhesive backing, which allows bend radius control device 500 to be attached to a printed circuit board, for example, and control the bend radius of one or more cables, without having to insert holes or other obstructions into the printed circuit board. In other embodiments of the present invention, however, fastener 505 may be a circuit board clip, screw, a hook-and-loop fastener, or some other type of fastener.

Figure 6:
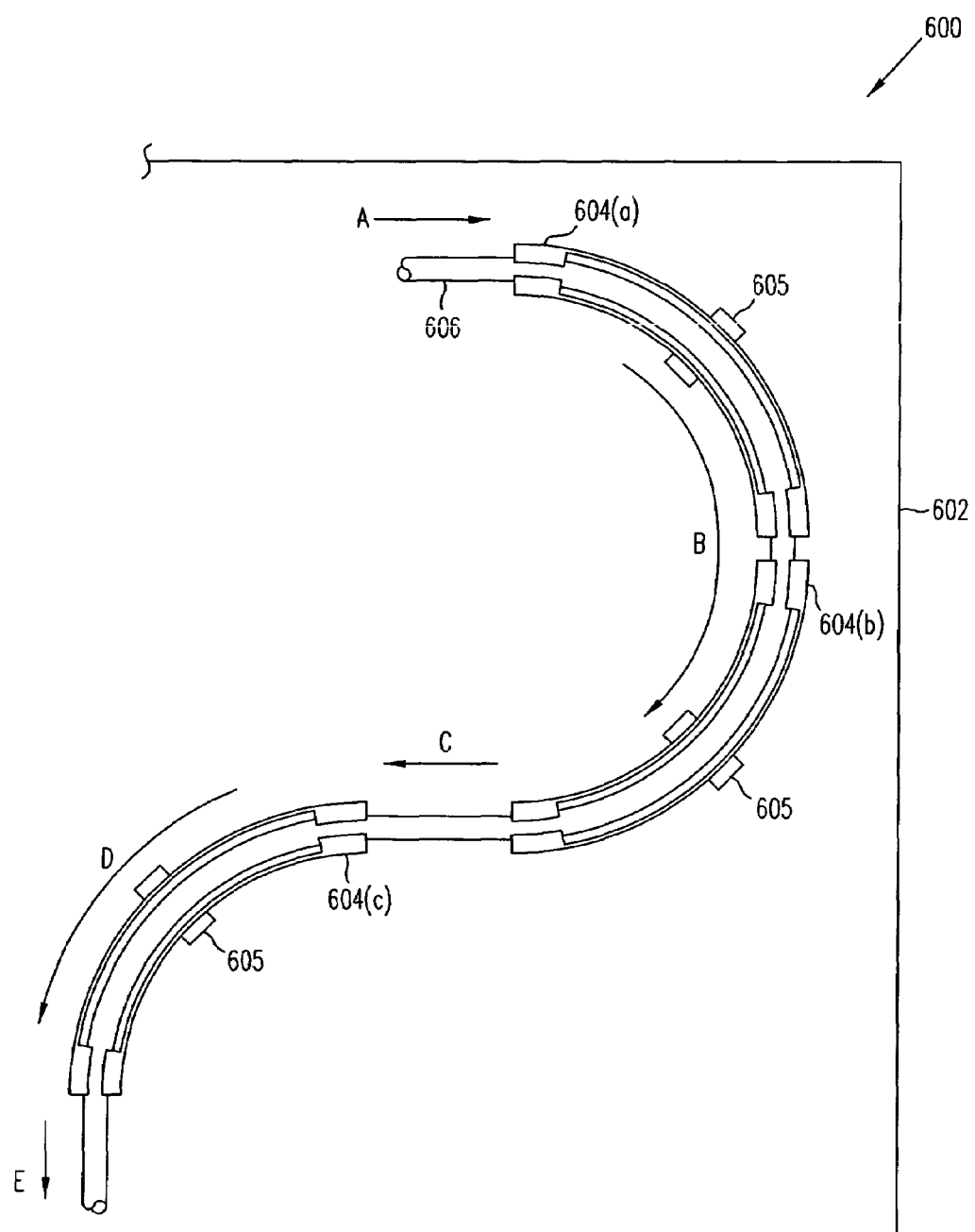
FIG. 6 illustrates a partial top view of a system including exemplary structures for controlling the bend radius of a cable on a printed circuit board according to the present invention.

FIG. 6 illustrates a partial top view of exemplary bend radius control devices used to control the bend radius of one or more cables within a system 600 according to the present invention. System 600 includes printed circuit board 602, which further includes bend radius control devices 604(a), 604(b), and 604(c), and fiber cable 606. Each bend radius control device 604 includes fastener 605. Fastener 605 is used to fasten each bend radius control device 604 to printed circuit board 602. In the described embodiment, fastener 605 is an adhesive backing which adheres each bend radius control device 604 to the surface of printed circuit board 602. However, fastener 605 may be a printed circuit board clip, one or more screws, or other fastener able to attach each bend radius control device 604 to printed circuit board 602.

Bend radius control devices 604 route fiber cable 606 along a path on printed circuit board 602. Specifically, bend radius control devices 604(a) and 604(b) guide fiber cable 606 from path A, through curve B, to path C. Path C is 180 degrees relative to path A. Although in the described embodiment curve B is formed from bend radius control devices 604(a) and 604(b), curve B may be formed from a single bend radius control device having a curve similar to the curve formed by bend radius control devices 604(a) and 604(b) together. From path B, fiber cable 606 is guided along curve D, and continues along path E. Path E is 90 degrees relative to path C. As fiber cable 606 is guided along curves B and D, bend radius control devices 604 protect fiber cable 606 and ensure that fiber cable 606 does not exceed the minimum bend radius of fiber cable 606. Configuring any number of bend radius control devices 604 in various positions, it is possible to form a cable path having any number of curves, each having a bend radius greater than or equal to the minimum bend radius of the cable, thus ensuring the integrity and reliability of the cable. For example, one embodiment of bend radius control device 604 may form a 270 degree bend, while another embodiment of bend radius control device 604 may form anywhere from a 1-360 degree curve.

Figure 7:
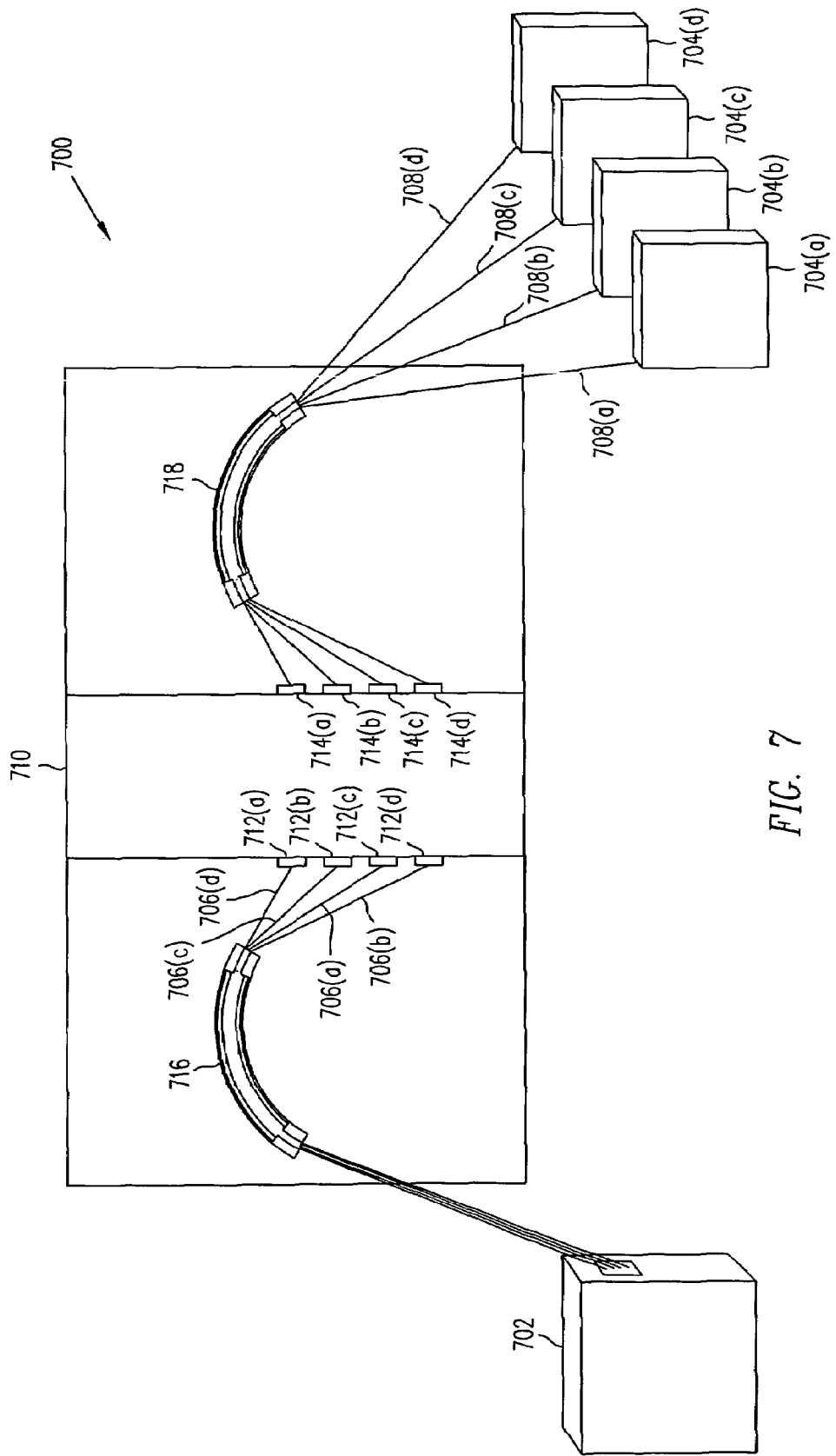
FIG. 7 illustrates a side view of a communication system including exemplary structures for controlling the bend radius of one or more cables according to the present invention.

FIG. 7 (not to scale) illustrates a side view of a system 700 for routing a number of fiber cables according to the present invention. System 700 includes a network node 702 optically coupled to customer node 704 via fiber cables 706 and 708 and a patch panel 710. Patch panel 710 includes connectors 712 and 714, and bend radius control devices 716 and 718. Bend radius control device 716 controls the bend radius of fiber cables 706 along their path from network gear box 702, through patch panel 710, to connectors 712. Bend radius control device 716 is attached to a surface of patch panel 710 with a fastener (e.g., fastener 505 of FIG. 5). In the described embodiment, bend radius control device 716 has a bend radius greater than or equal to the minimum bend radius of fiber cable 706(b), which is the fiber cable of fiber cables 706 having the tightest curve. Similarly, bend radius control device 718 controls the bend radius for the fiber cables 708 along their path from connector 714, through patch panel 710, to customer boxes 704. Bend radius control device 708 is attached to a surface of patch panel 710 with a fastener (e.g., fastener 505 of FIG. 5). In the described embodiment, bend radius control device 718 has a bend radius greater than or equal to the minimum bend radius of fiber cable 708(a), which is the fiber cable of fiber cables 708 having the tightest curve. Because of the relatively small size of bend radius control devices 716 and 718, the bend radius of fiber cables 706 and 708, respectively, can be controlled in the small space of patch panel 710.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A bend radius control apparatus comprising:
an arcuate member configured to define a cable pathway having a bend radius equal to or greater than a minimum bend radius of a fiber optic cable, wherein
said fiber optic cable comprises a core and a jacket, and
said arcuate member comprises
a first end and a second end;
a channel to receive said fiber optic cable defined between said first end and said second end of said arcuate member, and
at least one holding portion configured to hold said bend radius control apparatus to said fiber optic cable, said at least one holding portion comprising an insert configured to grip said fiber optic cable.

2. The bend radius control apparatus of claim 1, wherein said at least one holding portion is formed from a flexible wall of said arcuate member.

3. The bend radius control apparatus of claim 2, wherein said at least one holding portion comprises a slot defining an opening along a longitudinal side of said flexible wall.

4. The bend radius control apparatus of claim 3, wherein
a width of said opening defined by said slot is smaller than a diameter of said fiber optic cable,
said slot defining said opening along said longitudinal side of said flexible wall is configured to receive said fiber optic cable through said opening and to retain said fiber optic cable within said bend radius control apparatus once said fiber optic cable is received.

5. The bend radius control apparatus of claim 4, wherein said at least one holding portion comprises a retaining member defining said slot.

6. The bend radius control apparatus of claim 5, wherein said retaining member comprises a plurality of wings.

7. The bend radius control apparatus of claim 4, wherein said insert comprises a grommet.

8. The bend radius control apparatus of claim 7, wherein
said grommet comprises a slot defining an opening along a longitudinal side of said grommet, and
said slot defining said opening along said longitudinal side of said grommet is configured to receive said fiber optic cable.

9. The bend radius control apparatus of claim 7, wherein said grommet comprises a compressible material.

10. The bend radius control apparatus of claim 4, wherein said bend radius control apparatus has a circumference substantially equal to a circumference of said fiber optic cable.

11. The bend radius control apparatus of claim 4, wherein said arcuate member comprises a cylindrical arcuate member.

12. The bend radius control apparatus of claim 4, wherein
said at least one holding portion comprises a first holding portion integral with said first end and a second holding portion integral with said second end.

13. The bend radius control apparatus of claim 4, wherein said arcuate member comprises a plastic material.

14. The bend radius control apparatus of claim 4, further comprising:
a fastener coupled to an exterior surface of said arcuate member.

15. The bend radius control apparatus of claim 14, wherein said fastener comprises an adhesive backing.

16. The bend radius control apparatus of claim 4, wherein said bend radius control apparatus is attached to a printed circuit board.

17. The bend radius control apparatus of claim 4, wherein said bend radius control apparatus is attached to a patch panel.

18. The bend radius control apparatus of claim 1, further comprising:
a fastener coupled to an exterior surface of said arcuate member at a distance from said first and second ends.

19. The bend radius control apparatus of claim 1, wherein said insert comprises a grommet.

20. An apparatus, comprising:
a fiber optic cable;
an arcuate member coupled to said fiber optic cable and configured to define a cable pathway having a bend radius equal to or greater than a minimum bend radius of said fiber optic cable, wherein
said fiber optic cable comprises a core and a jacket, and
said arcuate member comprises:
a first end and a second end,
a channel to receive said fiber optic cable defined between said first end and said second end of said arcuate member, and
at least one holding portion configured to hold said arcuate member to said fiber optic cable, said at least one holding portion comprising an insert configured to grip said fiber optic cable.

21. The apparatus of claim 20, wherein said at least one holding portion is formed from a flexible wall of said arcuate member.

22. The apparatus of claim 21, wherein said at least one holding portion comprises a slot defining an opening along a longitudinal side of said flexible wall.

23. The apparatus of claim 22, wherein
a width of said opening defined by said slot is smaller than a diameter of said fiber optic cable,
said slot defining said opening along said longitudinal side of said flexible wall is configured to receive said fiber optic cable through said opening and to retain said fiber optic cable within said arcuate member once said fiber optic cable is received.

24. The apparatus of claim 23, wherein said insert comprises a grommet.

25. The apparatus of claim 24, wherein
said grommet comprises a slot defining an opening along a longitudinal side of said grommet, and
said slot defining said opening along said longitudinal side of said grommet is configured to receive said fiber optic cable.

26. The apparatus of claim 24, wherein said grommet comprises a compressible material.

27. The apparatus of claim 20, further comprising:
a fastener coupled to an exterior surface of said arcuate member at a distance from said first and second ends.

28. The apparatus of claim 20, wherein said insert comprises a grommet.

29. A method comprising:
inserting a fiber optic cable within a bend radius control apparatus, wherein
said bend radius control apparatus comprises
an arcuate member configured to define a cable pathway having a bend radius equal to or greater than a minimum bend radius of said fiber optic cable, wherein
said fiber optic cable comprises a core and a jacket, and
said arcuate member comprises
a first end and a second end, a channel to receive said fiber optic cable defined between said first end and said second end of said arcuate member, and at least one holding portion comprising an insert configured to grip said fiber optic cable; and holding said bend radius control apparatus to said fiber optic cable using said at least one holding portion.

30. The method of claim 29, wherein said inserting comprises:

inserting said fiber optic cable in each of said at least one holding portion; and inserting said fiber optic cable in said channel.

31. The method of claim 30, wherein said inserting said fiber optic cable in said at least one holding portion comprises:

inserting said fiber optic cable through an opening in said at least one holding portion, said opening defined by a slot along a longitudinal side of said arcuate member.

32. The method of claim 30, wherein said insert comprises a grommet, and said inserting further comprises inserting said fiber optic cable in said grommet.

33. The method of claim 30, further comprising:

attaching said bend radius control apparatus to a surface.

34. The method of claim 29, further comprising:

fastening said bend radius control apparatus to a substrate with a fastener at a distance from said first and second ends.

35. The method of claim 29, wherein said insert comprises a grommet.

36. An apparatus comprising:

means for controlling a bend radius of a fiber optic cable, wherein said fiber optic cable comprises a core and a jacket, and said means for controlling comprises a first end and a second end, means for supporting said fiber optic cable along a cable pathway having a bend radius equal to or greater than a minimum bend radius of said fiber optic cable, means for gripping said fiber optic cable, and means for receiving said means for gripping said fiber optic cable and for holding said apparatus to said fiber optic cable, and means for fastening said means for controlling said bend radius of said fiber optic cable to a substrate.

37. The apparatus of claim 36, wherein a portion of said means for receiving said means for gripping said fiber optic cable and for holding said apparatus to said fiber optic cable is formed from a flexible wall of said means for supporting said fiber optic cable.

38. The apparatus of claim 37, wherein said means for receiving said means for gripping said fiber optic cable and for holding said apparatus to said fiber optic cable comprises means for defining an opening along a longitudinal side of said flexible wall.

39. The apparatus of claim 38, wherein a width of said opening is smaller than a diameter of said fiber optic cable, and said means for defining said opening comprises means for receiving said fiber optic cable through said opening, and means for retaining said fiber optic cable within said apparatus once said fiber optic cable is received.

40. The apparatus of claim 36, wherein said means for fastening is coupled to an exterior surface of said means for controlling at a distance from said first and second ends.

41. The apparatus of claim 36, wherein said means for gripping said fiber optic cable comprises a grommet.

* * * * *